United States Patent [19]

Schmid et al.

[11] Patent Number: 4,963,610

[45] Date of Patent: Oct. 16, 1990

[54] FLAME-RESISTANT POLYAMIDE MOLDING COMPOSITION AND METHOD OF MANUFACTURE THEREOF

[75] Inventors: Eduard Schmid, Bonaduz; Doris Luedi, Chur, both of Switzerland

[73] Assignee: EMS-Inventa AG, Switzerland

[21] Appl. No.: 326,897

[22] Filed: Mar. 21, 1989

[30] Foreign Application Priority Data

Mar. 28, 1988 [DE] Fed. Rep. of Germany ....... 3810519

[51] Int. Cl.$^5$ .............................................. C08K 3/22
[52] U.S. Cl. .................................... 524/436; 524/413; 524/262; 524/606
[58] Field of Search ............... 524/606, 262, 436, 413; 525/66

[56] References Cited

U.S. PATENT DOCUMENTS

| | | | |
|---|---|---|---|
| 2,846,367 | 11/1974 | Burton | 524/606 |
| 3,830,777 | 8/1974 | Burton | 524/606 |
| 3,843,591 | 10/1974 | Hedrick et al. | 524/606 |
| 4,098,762 | 7/1978 | Miyata et al. | 524/162 |
| 4,314,929 | 2/1982 | Mahoney | 524/606 |
| 4,346,194 | 8/1982 | Roura | 525/66 |
| 4,381,366 | 4/1983 | Sanderson et al. | 525/66 |
| 4,506,056 | 3/1985 | Gaylord | 525/244 |
| 4,507,423 | 3/1985 | Sasaki et al. | 525/66 |
| 4,528,303 | 7/1985 | Segaud | 524/606 |
| 4,613,647 | 9/1986 | Yonaiyama et al. | 525/66 |

*Primary Examiner*—Veronica P. Hoke
*Attorney, Agent, or Firm*—Jordan B. Bierman

[57] ABSTRACT

A flame-resistant polyamide molding composition comprising a thermoplastic polyamide, a particular form of magnesium hydroxide, an olefin polymer having at least one functional group, and reinforcing fibers inert to the composition. The composition can be processed at temperatures above 300° C. without degradation or decomposition, can be processed to produce bodies having thin walls and high rigidity, and is of particular use in the electric and electronic fields. Moreover, the bodies possess excellent flame-retardant characteristics and form no droplets on contact with heat or an open flame. Therefore, molded parts prepared therefrom retain their functional integrity to a high degree, even in the case of fire because no corrosive gases are evolved, thereby minimizing the formation of short circuits.

56 Claims, No Drawings

FLAME-RESISTANT POLYAMIDE MOLDING COMPOSITION AND METHOD OF MANUFACTURE THEREOF

This application claims the priority of German DE 38 10 519, filed Mar. 28, 1988.

The present invention is directed to flame-resistant polyamide molding compositions; more specifically, such compositions which are made flame-resistant by the introduction of magnesium hydroxide and which are thermoplastically processable and fiber-reinforced.

BACKGROUND OF THE INVENTION

Flame-retardant polyamide compositions are well known in the art. The usual way of making polyamide flame-resistant is by the addition of halogen compounds together with a synergist, usually antimony trioxide. The disadvantage of this method is that poisonous and corrosive gases are released when the finished products become exposed to heat or an open flame. To eliminate this drawback, substitution of the known additives with low molecular weight nitrogen compounds, in particular cyanuric acid, melamine or their compounds which form melamine cyanurate. An example of this can be seen in DE-A No. 27 40 092 which describes the use of melamine cyanurate as a flameproofing agent for polyamide. The disadvantages here are that the parameters for processing are very narrow and the polymer mass deteriorates and flows very quickly under the influence of heat or an open flame.

If stiffening fibers such as glass fibers are also incorporated, the so-called "wicking effect" takes place. This means that the stiffening fibers act like the wick of a candle and actually promote burning. This class of compounds is therefore useless in cases where stiffened compositions are required.

It is recognized that known flame-retardant additives have a strong tendency towards surface migration. This adversely affects the electrical properties of bodies made therefrom. The problem is particularly acute for nitrogen and halogen compounds.

Some of the foregoing disadvantages are substantially overcome by materials such as aluminum hydroxide. This is available in finely divided, substantially spherical form, so that it can be readily introduced into elastomers without adversely effecting their flexibility. As such, these compositions find use as cable insulators where flame-resistance and flexibility are of substantial importance.

The action of aluminum hydroxide is based upon the elimination of water which starts at 190° C. As a result, it is useless in thermoplastic polyamide compositions, as they must be processed at much higher temperatures. Therefore, magnesium hydroxide, which releases water beginning at 340° C., has been considered as a flame-retardant for use in connection with such compositions. The flame-retardant effect is brought about by a combination of factors; namely, the cooling effect resulting from the release of water under the influence of heat, the formation of a protective gas screen which inhibits the access of oxygen, and the formation of a protective magnesium oxide layer or coating.

The preparation and use of a form of magnesium hydroxide as a flame-retardant for polypropylene has been described in "Plastics and Rubber Processing and Applications", 6 (1986) 169–175. The specific magnesium hydroxide taught is obtained from seawater in the usual manner and has a specific surface area of 40 $m^2/g$.

However, it has been necessary to use 50% to 60% by weight magnesium hydroxide and aluminum hydroxide in order to obtain the desired properties. In view of this high concentration, specialized mixing devices must be used in order to prepare them. In fact, JP-A-12943/1978 teaches the addition of large amounts of unsaturated metal soaps in order to obtain 70% by weight magnesium hydroxide compositions.

In U.S. Pat. No. 4,098,762, there is disclosed magnesium hydroxide which has been coated with an anionic surfactant; namely, sodium stearate. This composition is taught as being suitable as a flame-retardant additive for non-polar and strongly hydrophobic polymers, i.e. polyolefins.

A variation of the foregoing is found in EP-A-No. 52868. This reference describes a specific combination of a thermoplastic resin, magnesium hydroxide (which has been coated with an alkali oleate), and 0.1% to 10% by weight of magnesium and/or aluminum oleate. The minimum thickness of a test body obtained therefrom was 3.2 mm and, thus, the production of thin bodies is contra-indicated.

Moreover, the presence of unsaturations in the oleates makes them extremely sensitive to oxidation. As a result, they start to decompose at processing temperatures of approximately 300° C. The unsaturations cause the composition to discolor and its mechanical and flame-resistant properties to deteriorate. In addition, as in all such unsaturated compositions, continued use in the presence of heat and/or light causes oxidation which, in turn, leads to yellowing and other color changes.

BRIEF DESCRIPTION OF THE PRESENT INVENTION

By adherence to the parameters as set forth herein, it is possible to produce stiff polyamide molding compositions which can be processed without the addition of undesirable additives. Moreover, such compositions can be molded into bodies which are flame-resistant and exhibit a smooth surface along with high mechanical properties and high resistance to electrical tracking as well as being stable, that is, they do not discolor under the influence of heat or light. Resistance to surface leakage is also good and satisfies DIN 53480 which requires a value of not less than 550 Volts. When products of the present invention are tested in accordance with UL-94 (Underwriters Laboratories Inc.), they exhibit the best rating; namely, VO. This is true even in the case of test bodies which are only 1.6 mm thick.

The present invention is directed to reinforced, flame-resistant, thermoplastically processable polyamide molding compositions comprising (a) 25% to 40% by weight of a thermoplastic polyamide, (b) 40% to 70% by weight of magnesium hydroxide particles in platelet form and having a specific surface area of less than 18 $m^2/g$, (c) 0.1% to 20% by weight of an olefin homo- or copolymer having one or more functional groups, and (d) 3% to 30% by weight of reinforcing fibers which are inert to the composition.

Of course, usual processing aids, pigments, stabilizers, and other additives may be included.

The foregoing compositions are even processable at temperatures exceeding 300° C. without any evidence of decomposition. They are suitable for the preparation of thin-walled parts, producing bodies having rigidity and good mechanical properties. This makes them particularly suitable for use in connection with electronic parts.

Furthermore, after exposure to flame and withdrawal therefrom, the so-called "after burning time" or duration of burning is extremely short. The bodies achieve a VO rating in accordance with the UL-94 test. This is accomplished without "trickling", i.e. no burning chunks or droplets, capable of igniting other flammable materials, are formed. Moreover, even if they are damaged (as by heat or flame), the bodies retain their ability to function to a very high degree. This results from the fact that they do not generate any corrosive gases and that a protective layer of magnesium hydroxide and optionally intermeshed glass-fiber remains, therefore, creation of short circuits is substantially eliminated.

It is preferred that the polyamide be present in an amount of 25% to 35% based on the total composition. Suitable polyamides include semi-crystalline linear polyamides (preferably derived from monomers having 6 to 36 carbon atoms); amorphous polyamides of substituted or unsubstituted aliphatic, cycloaliphatic, or aromatic monomers; block polyamides having polyether segments; and copolyamides or blends, wherein the various named polyamides comprise the principal components; or mixtures of the foregoing. In particular, such polyamides as PA-6, PA-11, PA-12, PA-6.6, PA-6.9, PA-6.10, PA-6.12, and PA-6.13 have been found preferable. Also particularly suitable are derivatives of diamines and dicarboxylic acids having not more than 36 carbon atoms. Mixtures of the various polyamides have also been found useful.

Block or segmented polyamides, e.g. those containing polyether blocks, can be used. In the case of mixtures of semi-crystalline and amorphous polyamides, amounts of amorphous polyamide not exceeding 30% by weight of the total polyamide are preferred.

The polyamides of the present invention desirably have melt viscosities of 100 Pas to 2000 Pas, measured at 270° C. and a load of 122.6N, in accordance with DIN 53 735.

The magnesium hydroxide particles are in lamellar or platelet form. The specific surface area thereof is less than 18 $m^2/g$, preferably less than 12 $m^2/g$, and more preferably, 4 to 8 $m^2/g$. Insofar as possible, the magnesium hydroxide particles should be relatively uniform, well crystallized, and with minimum agglomeration tendencies. Those agglomerations which are present should, for best results, be readily split to permit the magnesium hydroxide to be easily incorporated into the composition and readily dispersed. The aspect ratio (thickness/diameter) is usefully above 4 and the magnesium hydroxide should be present in a preferred amount of 45% to 60% by weight and, most preferably, 50% to 55% by weight. It is also desirable that the magnesium hydroxide have a specific surface area of less than 12 $m^2/g$. An important advantage of the magnesium hydroxide of the invention is that it does not need any coating. Particularly suitable forms of magnesium hydroxide are available under the trade names Kisuma 5E from Kyowa, Tokyo, Japan or Ankermag H999 from the Veit'sche Magnesitwerke, (8700 Loeben, Austria).

The olefin homo- or copolymer is advantageously derived from α-olefinic monomers having 2 to 8 carbon atoms; in one form of the invention, two or more such α-olefins are used. It is particularly desirable to combine ethylene and propylene, there being 15% to 40% by weight of propylene present, based on the total amount of olefins. In addition to propylene, 1-butene, 1-hexene, and 1-octene have been found especially advantageous. Good results have been achieved when the olefinic polymer has a melt index (at 190° C.) of 0.1 g to 30 g per 10 minutes, and better results are found when the melt index is 0.4 g to 4.0 g per 10 minutes. The olefin is preferably present in an amount of 0.5% to 10% by weight, most preferably 1.0% to 5.0% by weight.

With regard to the functional groups on the olefin, it is best if they are capable of reacting with the magnesium hydroxide. These groups are on moieties which can be grafted on the base polymer or contained therein as part of the chain. Those groups which are acid acting, particularly carboxyl and/or acid anhydride groups, are recognized as being suitable. Also, maleic anhydride, acrylic acid, methacrylic acid, and their derivatives (such as esters), are particularly worthy of mention. Of the named acid acting groups, acrylic acid and maleic anhydride and their methyl or ethyl esters are most desirable.

The functional groups may be partly neutralized by cations; the polymers usefully contain 0.1% to 5.0% by weight of the functional groups, preferably 0.3% to 3.0%, both based on the total homo- or copolymer. It should also be noted that all of the foregoing types of olefinic polymers, as well as the substituents and components thereof, may be mixed and/or blended as desired.

While the materials of which the reinforcing fibers are made are not particularly critical, mineral and carbon fibers have been found satisfactory. Calcium titanate (in fiber or whisker form) has been used successfully, but glass fibers have been found even more useful. In a preferred embodiment of this phase of the invention, the fibers are coated with a material which promotes the compatibility of the fibers with the polymer (mainly polyamide) matrix. In particular, materials containing amino groups, especially amino silanes, work well.

The fibers are desirably present in an amount of 5% to 25% by weight and, preferably, 10% to 15% by weight, both based on the total composition. Of course, mixtures of the various types of fibers can also be employed within the scope of this invention. When the fibers are incorporated into the composition, frictional heat is generated. It is preferable to maintain the temperature as high as possible but, of course, below the decomposition point of any of the components.

The usual additives may also be included in the compositions of the present invention. These comprise coloring agents, pigments, processing aids, mold-release agents, waxes (which may be oxidized), mineral fillers, as well as heat, processing, light, etc. stabilizers which do not decompose under the very high processing temperatures. The amount of additives used will, of course, vary depending on function, but will rarely exceed 20% by weight.

Particular processing materials or additives which facilitate the dosing of the magnesium hydroxide, especially during a continuous process method, e.g. specially developed additives, especially pyrogenic silicon dioxide, can be added in amounts from 0.1 to 5% of the weight of the magnesium hydroxide. These are introduced into the melt preferably together with the magnesium hydroxide. It is more preferable to introduce the materials or additives as intimate mixtures with the magnesium hydroxide so that its free flowing behaviour is improved.

The molding compositions can be produced by melt-mixing the thermoplastic components and then adding the further components to the melt. In principle the olefin-homo- or copolymer can be added in one or more portions at any point during the mixing or extrusion processes. The melt-mixing can be performed batch-wise or continuously using well known mixing equipment. Continuous mixing is preferred and the use of co-kneaders or twin-screw extruders for this purpose is advantageous.

Because of the necessary high loading with magnesium hydroxide, the compositions of this invention can be made in one or more extrusion steps and the magnesium hydroxide can be added, depending on the available equipment, in one or more portions. This is illustrated in the Example wherein the thermoplastic components (a) and (c) are dry blended with processing aids, stabilizers and part of the magnesium hydroxide. This mixture is then melted and homogenized by using, for example, a twin-screw extruder or co-kneader. The remainder of the magnesium hydroxide is then added in a second extrusion step. The process may be carried out by (a) dry-mixing all the components and then continuously extruding or (b) dry-mixing the polyamide and olefin polymers with part of the remaining magnesium hydroxide and then continuously feeding the rest of the magnesium hydroxide directly into the melt in the extruder or kneader using a conveyor-belt or worm feeder.

(c) The addition of part or all of the magnesium hydroxide directly into the melt is best performed in a kneader or twin-screw extruder that generates an increase in free volume at the place where the magnesium hydroxide is added.

The reinforcing fibers are best added last and under such conditions as to minimize fiber damage. The temperature of the melt and the speed of rotation of the extruder should best be controlled so that the materials being incorporated can be introduced without appreciable degradation or decomposition of the polymer. It is to be preferred that this process take place at least 50° C. above the polyamide melting point. The temperature will vary depending upon the amount of additives and the melt index of the polyamide. The person of ordinary skill will understand adjustments which are to be made.

The following examples are intended to illustrate the invention.

EXAMPLE 1

A mixture of polyamide-6 having a melt viscosity of 320 Pa (at 270° C. and 122.6 N) and a maleic anhydride-grafted copolyolefin mixture is pre-mixed with 40% by weight of magnesium hydroxide particles in a tumble mixer. The copolyolefin mixture is a copolymer of ethylene/propylene and ethylene/1-butene, grafted with 0.3% by weight of maleic anhydride having a specific gravity of 0.87 and an MFI value (at 190°) of 60.8 g per 10 minutes. Further, 0.2% by weight of Loxiol G40 (available from Henkel, Federal Republic of Germany) is added. The magnesium hydroxide particles from Kyowa of Tokyo, Japan, are sold under the trade name Kisuma 5E and have a specific surface area of less than 8 m²/g. This mixture is blended on a twin-screw kneader sold under the designation ZSK 30 (from Werner and Pfleiderer of Stuttgart, Germany) at a melt temperature of 270° C. to 300° C. and a rotational speed of 150 rpm. Thereafter, the granulate formed is dried.

For the second extrusion pass, the granulate is dry mixed with the remaining magnesium hydroxide, then compounded at 270° to 300° C., and again processed to form a granulate. Endless glass fibers (Type X20 available from Silenka, Netherlands) having a cross-section of 10 μm are continuously introduced from rovings into the melt through a housing opening just upstream of the nozzle.

After drying to a water content below 0.05% by weight, the granulate is introduced into an injection molding machine (Allrounder 320/210/750 available from Arburg, Federal Republic of Germany) at a melt temperature of about 280° C., and a mold temperature of 80° C., and test bodies according to DIN standards 53 453 and 53 455 and also flat bars according to the standard UL-94, are produced at a molding temperature of 80° C.

EXAMPLE 2

In contrast to the composition according to Example 1, the same formulation of primary components is processed in a single extrusion pass. The mixture of the polyamide and copolyolefin granulate contains an additional 0.2% by weight Loxiol 728 and is dry blended to a homogeneous mixture in a tumble mixer. This mixture is introduced continuously into a twin-screw extruder of the type 2E40A (from Berstorff, Hannover), and pre-compounded at a melt temperature of 260°–300° C. and a screw rotation speed of 120 rpm. The addition of the total amount of magnesium hydroxide and chopped glass fibers (length 4.5 mm, diameter 10 μ supplied by Owens-Corning) into the polymer melt is conducted continuously via conveyor-type weighers and a worm feed through a special opening in the extruder at the point at which its volume increases. The resultant strand is granulated.

In the following Table, the parameters of the previous Examples are collated with further Examples 3 to 5, 10, and 11 and also Comparative Examples 6 to 9. In example 9, the Mg(OH)₂ is Versamag SZ available from Morton Thiokol, USA (which does not meet the criteria of magnesium hydroxide for this invention). In Example 10, a magnesium hydroxide available from the Veit'sche Magnesit Werke, 8700 Loeben, Austria, and sold under the trade name Ankermag H999 is used, having a specific surface area of 11 m²/g. and an aspect ratio of 4. In Examples 10 and 11, a very small amount of silicon dioxide is used as a metering aid. To achieve the rating of V0 the amount of magnesium hydroxide is minimized and the glass fiber content is increased to optimize the mechanical values.

The inventive Examples in which glass fibers are used show that, as a result of the described synergistic effect, a V0 rating can be obtained even with less than 50% magnesium hydroxide. Also shown is the influence of the shorter glass fibers which are formed by the greater shear-action of the Berstorff twin-screw extruder.

Without glass fibers, the desired average total burning period of less than 50 seconds for 5 test bodies is not attained, (comparative Examples 6 and 7), and this limit is also substantially exceeded by magnesium hydroxide which is not according to the invention (Example 9: 202 seconds). A comparison of Example 3 with Examples 6 and 7 shows the positive influence of the functionalized olefin copolymer. It will be understood that UL-94 ratings are from V0 (the best), through V1, V2, etc. to HB (high burning—the worst).

|  |  | Example No. | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| PA-6 (melt 270° C.; 122.6 N: 320 Pa · s) | wgt % | 30.5 | 30.5 | 27.4 | 30 | 33 | 40 | 37 | 33 | 37 | 28.8 | 29.5 |
| Functionalised Copolyolefin | wgt % | 4 | 4 | 3.6 | 4 | 4 | 6 | 5 | — | 5 | 4 | 4 |
| Mg(OH)$_2$ | wgt % | 53 | 53 | 54 | 50 | 47 | 54 | 58 | 52 | 58 | 48.5 | 48.7 |
| Coat |  | + | + | + | + | + | + | + | + | — | — | + |
| Spec. suface area. | m$^2$/g | <8 | <8 | <8 | <8 | <8 | <8 | <8 | <8 | >18 | <11 | <8 |
| Glass fibers (Rovings) | wgt % | 12.5 | 12.5* | 16 | 16 | 16 | — | — | 15 | — | 18.2 | 17.3 |
| SiO$_2$ | wgt % | — | — | — | — | — | — | — | — | — | 0.5 | 0.5 |
| Burning test 1,6 mm bars stored for 7 days at 70° C. | UL-94 | V0 | V0 | V0 | V0 | V0 | HB | V1 | HB | V1 | V0 | V0 |
| Burning duration sum of 5 test bodies | sec. | 30 | 8 | 8 | 13 | 13 | >200 | 68 | 51 | 202 | 10 | 7 |
| Impact strength dry | DIN 53453 | kJ/m$^2$ | 17 | 32 | 32 | 32 | 32 | 25 | — | 27 | 10 | 21 | 20 |
| Impact strength conditioned | DIN 53453 | kJ/m$^2$ | 22 | 23 | 20 | 22 | 26 | nb | — | 15 | 31 | 18 | 16 |
| Notch Impact Strength dry | DIN 53453 | kJ/m$^2$ | 4.0 | 5.2 | 6.5 | 5.6 | 6.1 | 2.0 | 3.8 | 5.0 | 3.0 | 4.8 | 4.6 |
| Notch Impact Strength conditioned | DIN 53453 | kJ/m$^2$ | 7.0 | 7.0 | 6.0 | 6.5 | 7.0 | 8.0 | 5.0 | 5.4 | 4.0 | 5.1 | 4.7 |
| Bending E-Modulus dry | DIN 53452 | kJ/m$^2$ | 7640 | 7530 | 8320 | 8020 | 7550 | 2360 | 2790 | 13670 | 4310 | 8720 | 8630 |
| Bending E-Modulus conditioned | DIN 53452 | kJ/m$^2$ | 4190 | 4010 | 4815 | 4525 | 4660 | 1120 | 1680 | 7840 | 2380 | 5110 | 5240 |
| Creep resistance KC. | DIN 53480 | Volt | 600 | 600 | 600 | 600 | 600 | 600 | 600 | 600 | 600 | 600 | 600 |

*chopped glass fibers, length 4,5 mm, diameter 10μ. Owens Corning (USA)

What we claim is:

1. A flame-resistant polyamide molding composition comprising
    (a) 25% to 40% by weight of a thermoplastic polyamide,
    (b) 40% to 70% by weight of magnesium hydroxide particles in platelet form having a specific surface area of less than 18 m$^2$/g,
    (c) 0.1% to 20% by weight of an olefin homo- or copolymer having one or more functional groups, selected from the group consisting of carboxyl acid, carboxyl anhydride and their corresponding esters and
    (d) 3% to 30% by weight of reinforcing fibers which are inert to said composition.

2. The composition of claim 1 wherein said groups are capable of reacting with said magnesium hydroxide.

3. The composition of claim 1 wherein said thermoplastic polyamide is present in an amount of 25% to 35% by weight based on said composition.

4. The composition of claim 1 wherein said thermoplastic polyamide is taken from the class consisting of semi-crystalline polyamides of monomers having 6 to 36 carbon atoms; amorphous polyamides of substituted or unsubstituted aliphatic, cycloaliphatic, or aromatic monomers; polyamides having polyether segments; copolyamides; or blends of polyamides wherein polyamides are the principal component.

5. The composition of claim 1 wherein said thermoplastic polyamide is aliphatic and semicrystalline.

6. The composition of claim 5 wherein said thermoplastic polyamide is taken from the class consisting of PA-6, PA-11, PA-12, PA-6.6, PA-6.9, PA-6.10, PA-6.12, PA-6.13, polyamides derived from diamines and dicarboxylic acids having not more than 36 carbon atoms, and mixtures thereof.

7. The composition of claim 1 wherein said thermoplastic polyamide is a polyether block polyamide.

8. The composition of claim 7 wherein said thermoplastic polyamide contains aliphatic polyether blocks.

9. The composition of claim 7 wherein said thermoplastic polyamide is a mixture of semicrystalline and amorphous polyamides.

10. The composition of claim 9 wherein said thermoplastic polyamide contains not more than 30% of said amorphous polyamide.

11. The composition of claim 1 wherein said thermoplastic polyamide has a melt viscosity at 270°/122.6N of 100 Pas to 2000 Pas.

12. The composition of claim 1 wherein said magnesium hydroxide has an aspect ratio of more than 4.

13. The composition of claim 1 wherein said area is less than 12 m$^2$/g.

14. The composition of claim 13 wherein said area is 4 to 8 m$^2$/g.

15. The composition of claim 1 wherein said magnesium hydroxide is 45% to 60% by weight of said composition.

16. The composition of claim 15 wherein said magnesium hydroxide is 50% to 55% by weight of said composition.

17. The composition of claim 1 wherein said olefin homo- or copolymer is derived from α-olefins.

18. The composition of claim 17 wherein said α-olefins have 2 to 8 carbon atoms.

19. The composition of claim 1 wherein said copolymer is of ethylene and at least one α-olefin.

20. The composition of claim 19 wherein there are at least 2 α-olefins.

21. The composition of claim 19 wherein said α-olefin is propylene.

22. The composition of claim 2 wherein said copolymer comprises 15% to 40% by weight of said propylene.

23. The composition of claim 20 wherein said α-olefin has 3 to 8 carbon atoms.

24. The composition of claim 23 wherein said α-olefin is taken from the class consisting of propylene, 1-butene, 1-hexene, and 1-octene.

25. The composition of claim 1 wherein said olefin homo- or copolymer has a melt index, measured at 190° C./122.6 N of 0.1 g to 30 g per 10 min.

26. The composition of claim 25 wherein said melt index is 0.4 g to 4.0 g per 10 min.

27. The composition of claim 2 wherein there is 0.5% to 10% by weight of said homo- or copolymer.

28. The composition of claim 27 wherein there is 1.0% to 5.0% by weight of said homo- or copolymer.

29. The composition of claim 1 wherein said homo- or copolymer has said groups grafted thereon or contained therein as chain members.

30. The composition of claim 29 wherein said groups are acid acting.

31. The composition of claim 30 wherein said groups are carboxyl and/or anhydride.

32. The composition of claim 30 wherein said groups are taken from the class consisting of maleic anhydride, acrylic acid, and methacrylic acid.

33. The composition of claim 29 wherein said groups are grafted onto the backbone of said homo- or copolymer.

34. The composition of claim 1 wherein less than all of said groups are neutralized.

35. The composition of claim 29 wherein there is 0.1% to 5.0% by weight of said groups, based on said homo- or copolymer.

36. The composition of claim 35 wherein there is 0.3% to 3.0% by weight of said groups, based on said homo- or copolymer.

37. The composition of claim 32 wherein said groups are acrylic acid or maleic anhydride.

38. The composition of claim 1 wherein said fibers are mineral, carbon, or mixtures thereof.

39. The composition of claim 38 wherein said fibers are asbestos, glass, calcium titanate, or mixtures thereof.

40. The composition of claim 39 wherein said fibers are glass.

41. The composition of claim 1 wherein said fibers are coated with a coating compatible with said polyamide and optionally said homo- or copolymer.

42. The composition of claim 41 wherein said coating contains amino groups.

43. The compositions of claim 42 wherein said coating is derived from amino silanes.

44. The composition of claim 1 wherein there is 5% to 25% by weight of said fibers in said composition.

45. The composition of claim 44 wherein there is 10% to 15% by weight of said fibers in said composition.

46. A method for the preparation of the composition of claim 1 comprising mixing in the melt said thermoplastic polyamide, said homo- or copolymer, said magnesium hydroxide and said fiber.

47. The method according to claim 46 wherein said magnesium hydroxide is added in several portions in one or more extrusion steps.

48. The method of claim 47 comprising premixing said polyamide, one of said several portions of said magnesium hydroxide and said homo- or copolymer in the dry state to form a blend, mixing said blend at a temperature above the melting point of said polyamide, adding stepwise to said blend at least one other of said several portions of said magnesium hydroxide and said fiber.

49. The method of claim 47 comprising feeding said polyamide, one of said several portions of said magnesium hydroxide, and said homo- or copolymer in defined portions into an inlet of a kneader to form a blend, mixing said blend at a temperature above the melting point of said polyamide, adding stepwise to said blend at least one other of said several portions of said magnesium hydroxide and said fiber.

50. The method of claim 48 wherein said magnesium hydroxide is blended in more than one extrusion step.

51. The method of claim 49 wherein said magnesium hydroxide is blended in more than one extrusion step.

52. The method of claim 46 wherein the fiber is incorporated during the last mixing step.

53. The method of claim 46 wherein said magnesium hydroxide is intimately mixed with 0.1 to 5.0 weight % of an additive to facilitate dosing.

54. The method of claim 53 wherein said additive is pyrogenic silicon dioxide.

55. The composition of claim 1 wherein there is 13% to 30% by weight of said reinforcing fibers.

56. The composition of claim 1 further comprising up to 20% by weight of at least one additive taken from the class consisting of processing aids, stabilizers, minerals, pigments, and coloring agents.

* * * * *